(12) United States Patent
Clarke et al.

(10) Patent No.: US 8,070,444 B2
(45) Date of Patent: Dec. 6, 2011

(54) TURBINE WITH COAXIAL SETS OF BLADES

(75) Inventors: Joe Clarke, Glasgow (GB); Cameron Johnstone, Dunblane (GB); Gary Connor, Edinburgh (GB); Andrew Douglas Grant, Troon (GB)

(73) Assignee: University of Strathclyde, Glasgow (GB)

( * ) Notice: Subject to any disclaimer, the term of this patent is extended or adjusted under 35 U.S.C. 154(b) by 974 days.

(21) Appl. No.: 11/997,810

(22) PCT Filed: Aug. 1, 2006

(86) PCT No.: PCT/GB2006/002857
§ 371 (c)(1),
(2), (4) Date: Feb. 4, 2008

(87) PCT Pub. No.: WO2007/017629
PCT Pub. Date: Feb. 15, 2007

(65) Prior Publication Data
US 2008/0226450 A1    Sep. 18, 2008

(30) Foreign Application Priority Data
Aug. 5, 2005 (GB) .................................. 0516149.2

(51) Int. Cl.
*F01D 5/14* (2006.01)
(52) U.S. Cl. .................... 416/124; 416/128; 416/198 R; 415/4.3; 415/66; 415/68; 290/44; 290/55

(58) Field of Classification Search ............ 415/4.3, 415/4.5, 66, 68, 69, 908; 416/124, 126, 198 R, 416/198 A, 201 R, 201 A; 290/44, 55
See application file for complete search history.

(56) References Cited

U.S. PATENT DOCUMENTS

| 4,039,848 | A    | 8/1977  | Winderl |
| 5,506,453 | A *  | 4/1996  | McCombs ............... 290/44 |
| 6,492,743 | B1 * | 12/2002 | Appa ..................... 290/55 |
| 6,856,042 | B1 * | 2/2005  | Kubota ................... 290/55 |
| 6,945,747 | B1 * | 9/2005  | Miller ................... 415/4.3 |
| 7,074,011 | B1 * | 7/2006  | Wobben .................. 416/126 |
| 7,102,249 | B2   | 9/2006  | Wobben |

FOREIGN PATENT DOCUMENTS

| CH | 316900        | 10/1956 |
| EP | 1 467 093     | 10/2004 |
| GB | 758628        | 10/1956 |
| WO | WO 03/025385  | 3/2003  |
| WO | WO 2004/031577| 4/2004  |

OTHER PUBLICATIONS

International Search Report for International Application No. PCT/GB2006/002857.

* cited by examiner

*Primary Examiner* — Igor Kershteyn
(74) *Attorney, Agent, or Firm* — Alston & Bird LLP

(57) ABSTRACT

A turbine (5) having at least two sets of co-axially mounted, rotatable blades (10, 15) arranged so that one set cannot eclipse another. Preferably, the sets of blades (10, 15) are contra-rotatable. Each set of blades (10, 15) may be operable to extract similar amounts of energy, thereby to minimise the net reactive torque.

22 Claims, 3 Drawing Sheets

D = drag force (in the relative flow direction)
L = lift force (in to the relative flow direction)
C is the blade chord length:   B = number of blades on the rotor.

TURBINE WITH COAXIAL SETS OF BLADES

The present invention relates to a turbine, and in particular a turbine for use in power generation from a tidal stream.

BACKGROUND

Diminishing oil reserves, Governmental incentives and increased awareness of environmental issues have seen a rise in the use and desirability of generating power from renewable energy sources such as wind, solar and hydro energy. However, whilst renewable energy sources often have advantages in terms of sustainability and environmental impact, in many cases they also suffer from disadvantages such as unpredictability in supply. For example, generating energy by harnessing wind or solar energy is limited to when the wind blows or the sun shines brightly. These situations are subject to a high degree of uncertainty, especially in time scales of the order of a week or greater. This leads to difficulties in maintaining a constant supply to the electricity grid and may lead to difficulties in scheduling power generation resources and the need for standby generation capacity.

In recent years, one of the most high profile forms of renewable energy has been wind power. Wind turbines are used to harness wind power to generate electricity. Wind turbines generally have two or more open blades, optimised for rotation by wind and mounted to a shaft that drives a generator via a gearbox. Typically, the blades are mounted high on a support. To obtain utility levels of power, several turbines are often grouped together. Thus, wind turbines used for power production on a large scale are generally large, visually intrusive structures and often located in areas of natural beauty. As such, wind turbine developments are often subject to objections by local residents, environmentalists and natural heritage groups.

Hydropower is another well-known form of renewable energy. This may be extracted via a range of technologies. These include the damming of rivers to allow a controlled release of the water through turbines and the use of tidal dams that allow water to flow through the dam via sluices during rising tides and stored water to flow through turbines during low tides. However, these methods suffer from a range of problems including high construction costs, a lack of suitable sites and adverse environmental impact due to the need for sizable structures and flooding of land.

Another form of hydropower is wave power. This may be harnessed by various means, including funneling devices that channel waves up into a chamber either driving a turbine directly or causing air flow that drives the turbine. Another approach is to deploy a multi-segmented floating structure that uses the relative movement between segments caused by waves to actuate a piston that drives a generator. These methods also suffer from drawbacks, including a low capture efficiency and exposure to potentially damaging storms and extreme sea conditions.

One promising means of hydropower extraction is through the use of water turbines. These are devices that utilise blades that are turned by water flow, for example in rivers or due to tidal currents. An advantage of this approach is that power generation equipment can often be submerged or sited out at sea, away from habitation to avoid visual impact. As such, movement of water in the form of tidal currents is an ideal and under-exploited source of renewable energy.

Conventional water turbine technology typically uses a turbine having a single rotor, each rotor having two or more blades, arranged so as to rotate under the action of water currents. The rotor may be open or enclosed within a cowl. Power take-off is generally by means of a shaft coupled to the rotor that drives a conventional generator. Alternately, the turbine can be used to pressurize a hydraulic fluid to drive a hydraulic motor that in turn operates an electrical generator. The speed of rotor shaft rotation may be controlled to the optimum generator speed by providing a gearbox between the rotor and the generator. Turbines may be hung below floating pontoons or be anchored to the sea floor or riverbeds.

Despite the advantages of using tidal and river power, there are some challenges that must be overcome in exploiting this energy source. As water is denser than air, water turbines generally tend to be slower turning and are subjected to higher torque than equivalent wind turbines. In order to operate a generator at an efficient speed, the rotational speed of the water turbine generally needs to be increased through the use of gearing. Due to the high torque, the required gearings are generally heavy and inefficient. In addition, they add excess weight and complexity to the system and require increased maintenance. Also, operation of conventional water turbines can create a turbulent downstream flow of water, akin to a wake from a boat. This can lead to a scouring of the sea floor or riverbed downstream of the turbine.

Maintenance of water turbines can also be problematic due to the detrimental effect of fouling caused by the growth of waterborne organisms on the system and the corrosive effect of salt water. These problems are compounded by the difficulty of turbine access. Installation and removal of these devices can also be problematic. Due to the high torques experienced by water turbines, firm securing means, such as piling, are generally used. These require a high degree of installation time, are costly and can have an adverse environmental impact. An alternative approach is to use a heavily weighted base. However, this is unsuitable for systems having a high reactive torque, which may result in movement of the turbine installation.

An object of the present invention is to provide a solution to at least one of the above problems.

SUMMARY OF INVENTION

According to a first aspect of this invention there is provided a turbine having at least two sets of co-axially rotatable blades arranged so that one set cannot eclipse another.

One set of blades may have more blades than the other. One set of blades may have an even number of blades and the other set of blades may have an odd number of blades. The sets of blades may be mounted substantially adjacent to one another. At least one set of blades may be arranged to be upstream of at least one other set of blades. At least one set of blades may be arranged for contra-rotation relative to at least one other set of blades.

At least one of the sets of blades may be mounted to a first shaft. At least one other set of blades may be mounted to a second shaft.

The turbine may be used to operate an electrical generator having a rotor or rotors and a stator. The stator may be rotatable. The rotor of the generator may be coupled with the first shaft and the stator of the generator may be coupled with the second shaft. The first and second shafts may be co-axial. The stator and rotor may be arranged such that in use, they contra-rotate relative to each other.

According to a second aspect of this invention there is provided a turbine having at least two adjacent sets of co-axially mounted, contra-rotatable blades of dissimilar blade number, the number of blades being selected so that the net reactive torque in use is minimised or reduced to within a pre-determined range.

The blades in one set may have a different profile to blades in another set. At least two sets of blades may be arranged so that one set cannot eclipse another adjacent set. One set of blades may have more blades than the other. One set of blades may have an even number of blades and the other set an odd number of blades.

According to another aspect of this invention there is provided a turbine having at least two sets of co-axially mounted, contra rotating blades, one being upstream of the fluid flow in use and the other being downstream, wherein the downstream blades are arranged so as to counteract the swirl caused by the upstream blades and thereby minimise the total downstream swirl.

The turbine may be arranged to be driven by tidal currents.

DESCRIPTION OF DRAWINGS

Various aspects of the invention will now be described by way of example only and with reference to the accompanying drawings of which.

DETAILED DESCRIPTION OF THE DRAWINGS

Figure 1:
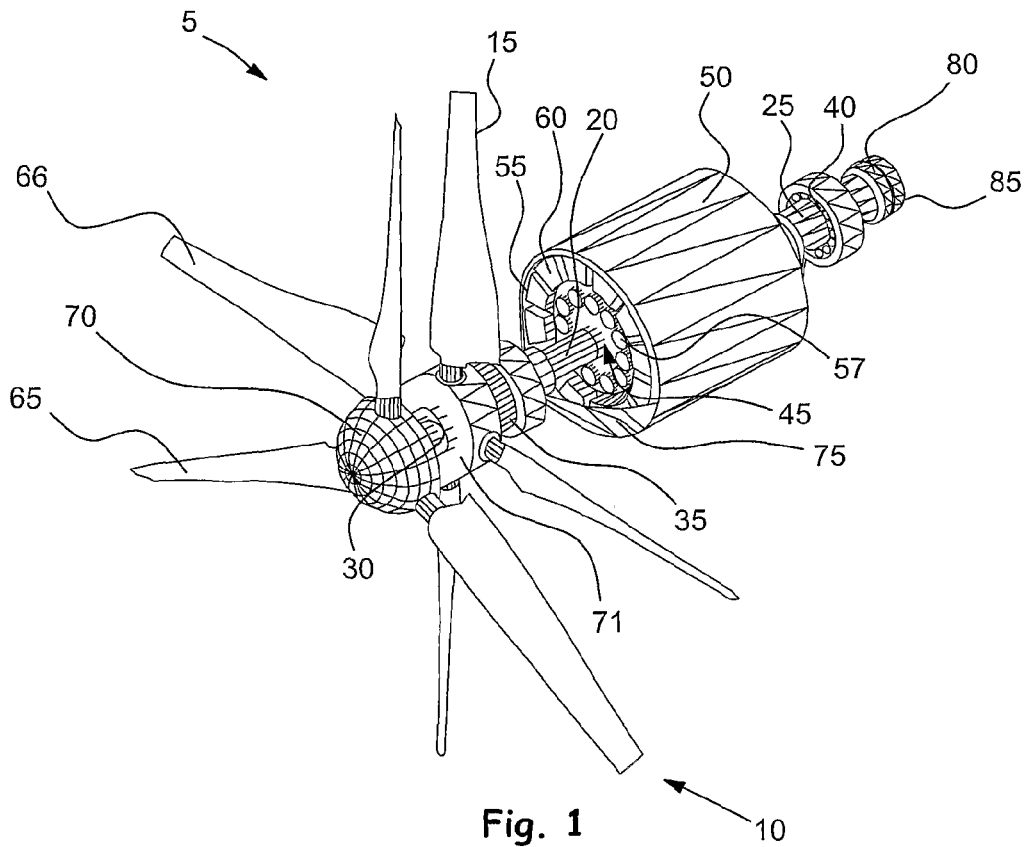
FIG. 1 is a perspective view of a contra rotating turbine and generator unit with the generator housing cut away in cross section.
Figure 4:
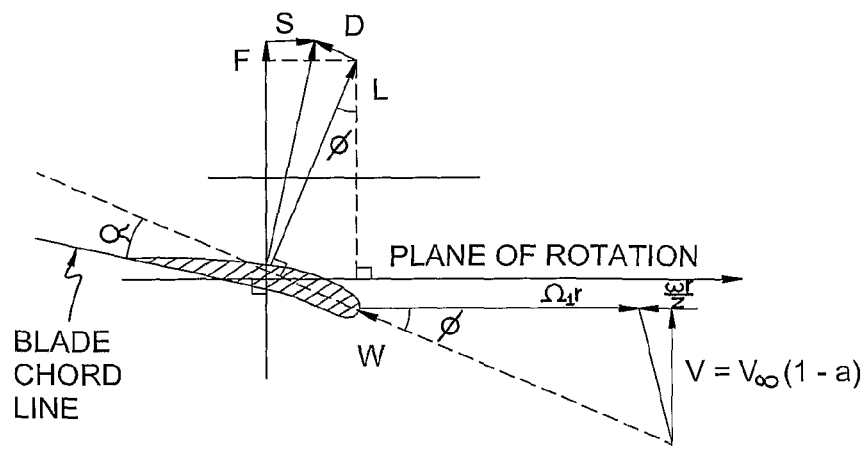
FIG. 4 is a velocity vector diagram of a cross section of a blade from the first, frontmost set of blades of the turbine of FIG. 1.
Figure 2:
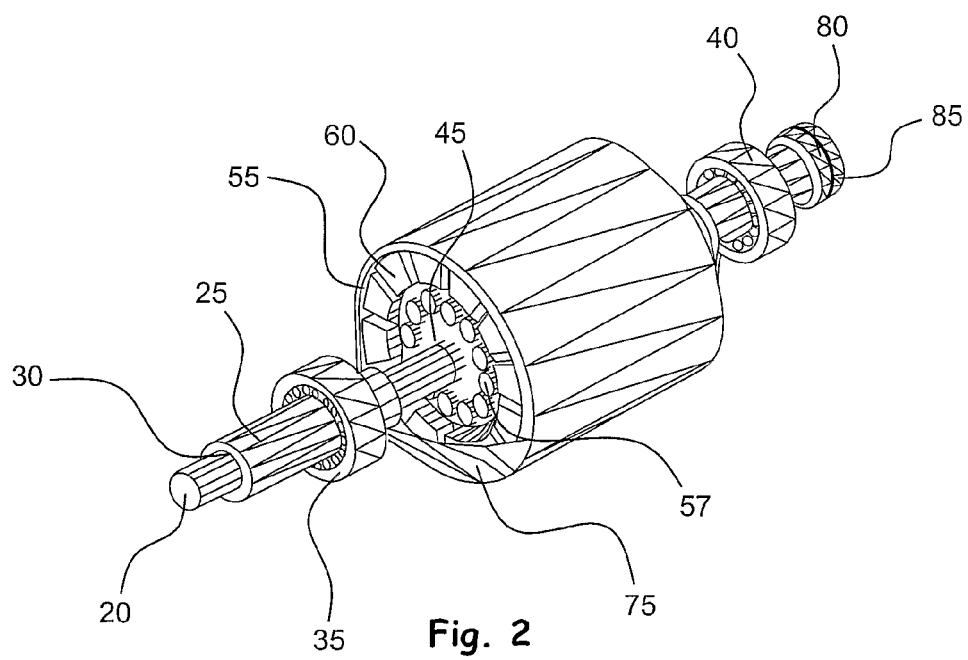
FIG. 2 is a perspective view from the front of the generator of FIG. 1 with the sets of blades removed.
Figure 3:
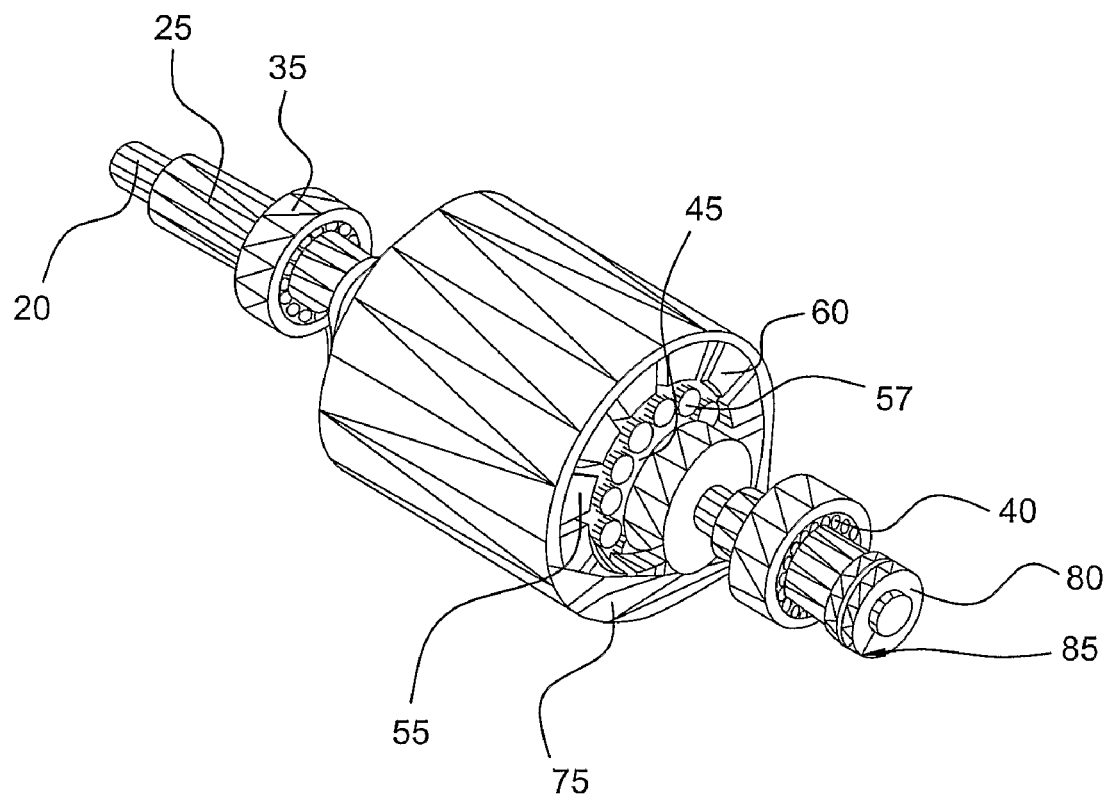
FIG. 3 is a perspective view from the rear of the generator of FIG. 1 with the sets of blades removed.

FIG. 1 shows a turbine 5 having two adjacent sets of blades, a first set 10 that is coupled with a first shaft 20, coaxially mounted with a second set 15 that is coupled with a second shaft 25. As shown in FIG. 2, the first shaft 20 is rotatably located in a hollow cavity 30 running axially inside the second shaft 25 and the second shaft is rotatably supported by bearing units 35, 40. The first shaft 20 is directly coupled with a rotor 45 of a generator 50 and the second shaft 25 is directly coupled with a rotatable stator 55. The profile and orientation of the blades 65 in each set 10, 15 is such that the first set of blades 10 contra-rotates relative to the second set 15 under the action of a fluid flow. This causes contra-rotation of the respective shafts 20, 25 and thereby the rotor 45 and stator 55 of the generator 50.

The generator 50 may be of any known form, although in this example it is a direct current unit, in which the rotor 45 has a plurality of windings of metal cable 57 and the stator 55 is in the form of permanent magnets (poles) 60 mounted on a rotatable stator housing 75 and arranged around the rotor 45. Power electronics are electrically connected to the windings 57 of the rotor 10 in order to regulate and invert the voltage supply, as is known in the art. These power electronics 90 are contained within a rotating housing 95 on the rotor shaft 20. The electrical power output from the power electronics 90 is fed to a pair of slip rings 80 at the rear. The slip rings 80 enable electrical power take-off via brush gear 85. These feed a static power take off cable (not shown) connecting the generator 50 to an electrical supply network. The generator is adapted to preventingress of water, for example by enclosing it within a hermetically sealed generator casing.

In order to optimise the generator performance, the blades 10, 15 are arranged so that one set cannot be completely eclipsed by the other at any point in the power generation cycle. This arrangement prevents one or more of the blade sets from stalling. This can be achieved by, for example, having one set with an even number of equally spaced blades and the other set with an odd number of evenly spaced blades. In practice, as energy is extracted from the tidal flow by the first set of blades 10, the energy content of the flow onto the second set of blades 15 is reduced. In order that both sets of rotors are balanced and extract similar quantities of energy (preferably substantially the same), the second set of blades 15 has more blades than the first set of blades 10. In this way, the net reactive torque is minimised. As a specific example, the first set 10 may have three equally spaced blades whilst the second set 15 may have four.

The blades 65, 66 have a general hydrofoil profile in order to maximise the efficiency in typical operating conditions. The profile may be optimised to give a gentle stalling profile and intolerance to surface imperfections, as is known in the art. The blade tip profile has a varying radius of curvature in order to minimise blade tip swirl. The ideal blade design differs from that of a blade for use with a similarly rated turbine having a single set of blades since each set of blades 10, 15 of the present invention only extracts about half the power. The blades 65, 66 in the present invention therefore have a comparatively lighter load and thus run at a higher rotation speed. Therefore, a blade 65 or 66 optimised for the present invention may vary in features such as chord length, blade angle, twist and taper compared with a blade optimised for use in a turbine having only one set of blades.

In use the first set of blades 10 distorts the flow of fluid that impacts the second set of blades. Therefore, the flow conditions experienced by the second set of blades 15 differ from that experienced by the first set 10. As such, the optimum blade configuration will also vary. To minimise the total resultant swirl produced by the turbine, the blades 66 of the second turbine have a radius of curvature and tip profile such that the swirl produced counteracts the swirl produced by the blades of the first set of blades. The optimum blade configuration for the upstream 65 and downstream 66 blades may be calculated using blade element theory.

Blade element theory when applied to the blades of a conventional turbine having a single set of blades, equates forces on the blade and on the fluid stream in axial and tangential directions, through the equations $$dF = 4\pi r \rho V_\infty^2 a(1-a)dr = \pi \rho \sigma W[C_L \Omega r(1+a') + C_D V_\infty(1-a)]r.dr \quad \text{(axial)}$$

and $$dS = 4\pi r^2 \rho V_\infty (1-a)a'\Omega.dr = \rho W \sigma [C_L V_\infty (1-a) - C_D \Omega r (1+a')]r.dr \quad \text{(tangential)}.$$

where dF is an axial force acting on a blade element in Newtons, dS is a tangential force acting on a blade element in Newtons, r is distance between the centroid of a blade element and the rotor centre in metres, $\rho$ is the fluid density in kg/m$^3$ of the flow, $V_\infty$ is the stream velocity in m/s, W is the velocity of the stream relative to the blade in m/s, $\Omega$ is the angular velocity of the rotor in rad/s, a and a' are axial and tangential flow parameters respectively, $\sigma$ is the rotor solidity at radius r, R is the rotor radius in meters and $C_L$ and $C_D$ are the blade lift and drag coefficients respectively.

These equations are solved by an iterative process to produce converged values of the flow parameters a and a', after which the velocity vectors shown in FIG. 2 may be evaluated. Performance predictions for the complete set of blades are obtained from a summation over all blade elements, making an appropriate allowance for blade tip losses.

In predicting the performance of two contra-rotating sets of blades 10, 15, certain assumptions must be made. It is assumed that the sets of blades 10, 15 are in close proximity, and function as a single actuator disc as far as turbine performance is concerned. Secondly, it is assumed that the swirl imparted to the flow by the upstream set of blades 10 is removed by the downstream set of blades 15, i.e. there is minimum reaction torque transferred to the structure that supports the sets of blades. Thus, the blade configuration calculated using this method yields a blade design that results in little or no reactive torque.

The blade design procedure for a turbine of the present invention involves prescribing a geometry for the upstream set of blades 10, obtaining converged solutions for a and a' and using these to specify an appropriate geometry for the downstream set of blades 15. To obtain a closed solution to the momentum equation for the upstream set of blades 10, a further assumption is required. It is clear that the equation above for dF does not validly apply to the upstream blades 10, as the upstream set of blades 10 will only experience a fraction of the total retarding force on the fluid stream. However, it is necessary to specify this fraction for the equation to be solved. In practice a wide range of conditions may occur, and these would need to be investigated. Although in practice, a set of blades would be designed for optimum performance in specified flow conditions.

In these calculations, a "symmetrical" case is used, where the sets of blades run at the same tip speed ratio and it is assumed that each experiences the same axial thrust loading, equal of course to one half of that experienced by the fluid stream. Therefore $$\lambda_1 = \lambda_2, \; dF_1 = dF_2, \text{ and } dS_1 = dS_2.$$

Where $\lambda$ is the blade tip speed ratio, defined by $\lambda = \Omega R / V_\infty (-)$.

Extending this to each blade element, the equation for dF for the upstream set of blades is modified to $$dF = 2\pi r \rho V_\infty^2 a(1-a) dr = \pi \rho \sigma W[C_L \Omega r(1+a') + C_D V_\infty (1-a)] r.dr$$

The equations are then solved to give values of a and a'. For the set of blades as a whole, parameters such as axial thrust, torque and power output may be computed at this stage.

Figure 5:
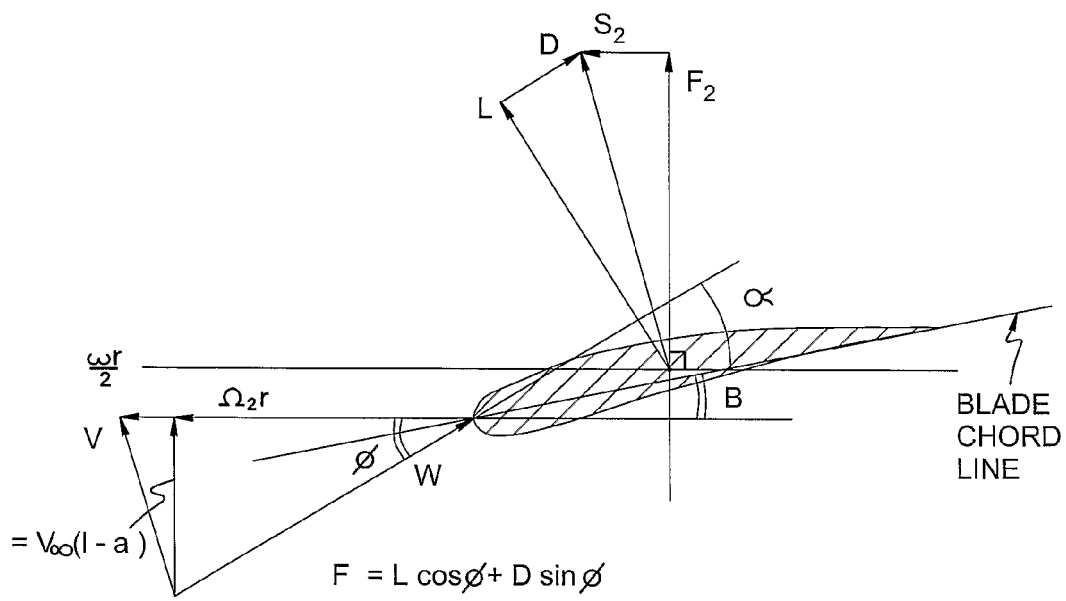
FIG. 5 is a velocity vector diagram of a cross section of a blade from the backmost set of blades of the turbine of FIG. 1.

For the downstream set of blades 15, the velocity and force vector diagrams (FIG. 5) are similar, but not identical, to those for the upstream blades 10. The angle associated with the apparent flow vector in degrees, $\phi$, is obtained from $$\tan\phi = \frac{V_\infty(1-a)}{\Omega r},$$

Therefore, $\phi$ can be determined as a has already been determined. Thus, the momentum equations reduce to $$\frac{\sigma C_N}{2} = \frac{a}{1-a}\sin^2\varphi$$

and $$\frac{\sigma C_T}{4} = a' \sin\varphi \cdot \cos\varphi,$$

where $C_N = C_L \cos\phi + C_D \sin\phi$ is the axial or normal force coefficient, and $C_T = C_L \sin\phi - C_D \cos\phi$ is the tangential force coefficient.

These are then combined to eliminate $\sigma$, giving $$\frac{C_T}{C_N}\tan\varphi = \frac{2a'(1-a)}{a}.$$

This equation is solved by an iterative process involving presenting values of the blade pitch angle $\beta$, where $\beta = \phi - \alpha$, until a solution is found. The procedure is to increase $\beta$ by small increments until the imbalance in this equation is minimised. When this is achieved, solidity $\sigma$ is calculated, and the blade chord length determined.

A turbine 5 and generator 50 such as those described herein have many advantages over conventional technologies. The provision of multiple sets of turbine blades 10, 15 increases the efficiency of energy capture. Further, having two contra-rotating sets of blades 10, 15 in close proximity leads to near zero reactive torque on the system. This has many advantages, including allowing greater flexibility in the design of the supporting structure, possibly eliminating the need for piling to be placed in the sea or river bed. In addition, components may be made lighter and more cheaply, as they do not need the strength to withstand the high degree of reactive torque. The greater relative rotational speed of the rotor and stator enables up to a 50% reduction in the number of machine electrical poles in comparison to a standard machine of the same rating. This allows the use of a much lighter, simpler and more compact gearing mechanism or even no gearing at all, with the generator being directly driven. As the swirl produced by the downstream blades can be arranged so as to substantially cancel out the swirl produced by the upstream blades, the environmental impact associated with scouring of the seabed by swirl can be greatly reduced. Furthermore, the relative motion of the contra-rotating rotors may be such that marine organisms will find it harder to settle on the rotors, leading to a reduction in bio-fouling of the blades.

A skilled person will appreciate that variations of the disclosed arrangements are possible without departing from the invention. For example, whilst in the turbine described herein, the rotor and stator of the generator are each directly coupled to a corresponding set of turbine blades, it will be appreciated that other arrangements involving indirect coupling via at least one gearing mechanism between at least one of the sets of turbine blades and the generator may be used. Also, whilst a specific example of a system having two shafts, one associated with each of the sets of turbine blades has been described, it will be appreciated that only one shaft and a suitable means of coupling both sets of turbine blades may be used, for example, an orbital gearing system. Furthermore, although the turbine described is arranged for optimum performance in one direction, modification of the blade shape and generator housing can make it suitable for bi-directional use. In addition, whilst the blades described in the present invention are open, a cowling may be used to increase the collection area and speed up flow. Accordingly, the above description of the specific embodiment is made by way of example only and not for the purposes of limitation. It will be clear to the skilled person that minor modifications may be made without significant changes to the operation described.

The invention claimed is:

1. A turbine having at least two sets of co-axially mounted, contra-rotating blades of dissimilar blade number arranged so that one set cannot eclipse another, one set of blades being upstream of the fluid flow in use and the other being downstream, wherein the downstream blades are arranged/shaped so as to counteract the swirl caused by the upstream blades to minimize or reduce the total downstream swirl, each set of blades being operable to extract similar amounts of energy, wherein the blades in one set have a different profile from the blades in the other set and the profile of the blades is such that there is a different reactive torque generated by each blade relative to a blade of the other set such that there is substantially no reactive torque between them.

2. A turbine as claimed in claim 1 wherein one set has an even number of blades and another set has an odd number of blades.

3. A turbine as claimed in claim 1, wherein the sets of blades are mounted substantially adjacent to one another.

4. A turbine as claimed in claim 1, wherein at least one of the sets of blades is arranged for contra-rotation relative to at least one other set of blades.

5. A turbine as claimed in claim 1, wherein at least one of the sets of blades is mounted to a first shaft.

6. A turbine as claimed in claim 5, wherein at least one other set of blades is mounted to a second shaft.

7. A turbine as claimed in claim 6, wherein the turbine is used to operate an electrical generator having a rotor or rotors and a stator.

8. A turbine as claimed in claim 7, wherein the stator is rotatable.

9. A turbine as claimed in claim 8, wherein the rotor of the generator is coupled with the first shaft and the stator of the generator is coupled with the second shaft.

10. A turbine as claimed in claim 9 wherein the first and second shafts are co-axial.

11. A turbine as claimed in claim 10 wherein the stator and rotor or rotors are arranged such that in use, they contra-rotate relative to each other.

12. A turbine blade for use in the turbine of claim 1 having a hydrofoil profile.

13. A turbine blade for use in the turbine of claim 1 having a varying radius of curvature.

14. A turbine as claimed in claim 1 arranged to be driven by tidal currents.

15. A generator that includes a turbine as claimed in claim 1.

16. A turbine having at least two adjacent sets of co-axially mounted, contra-rotatable blades of dissimilar blade number, each set being operable to extract similar amounts of energy, thereby to minimise the net reactive torque in use.

17. A turbine as claimed in claim 16 wherein blades in one set have a different profile to blades in another set.

18. A turbine as claimed in claim 17 where the profile of the blades in a set of blades is such that there is a different reactive torque generated by each blade relative to a blade of another set of blades such that there is substantially no reactive torque between them.

19. A turbine as claimed in claim 16 wherein the at least two sets of blades are arranged so that one set cannot eclipse another.

20. A turbine as claimed in claim 19 wherein one set has more blades than the other.

21. A turbine as claimed in claim 20 wherein one set has an even number of blades and the other set has an odd number of blades.

22. A turbine having at least two sets of co-axially mounted, contra rotating blades, one being upstream of the fluid flow in use and the other being downstream, wherein the downstream blades are arranged/shaped so as to counteract the swirl caused by the upstream blades to minimise or reduce the total downstream swirl.

* * * * *